US009526120B2

(12) United States Patent
Pelly et al.

(10) Patent No.: US 9,526,120 B2
(45) Date of Patent: Dec. 20, 2016

(54) TECHNIQUES FOR CONTEXT-BASED APPLICATION INVOCATION FOR SHORT-RANGE WIRELESS COMMUNICATION INTERACTIONS

(71) Applicant: Google Inc., Mountain View, CA (US)

(72) Inventors: Nicholas J. Pelly, San Francisco, CA (US); Benjamin J. Dodson, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 330 days.

(21) Appl. No.: 13/834,622

(22) Filed: Mar. 15, 2013

(65) Prior Publication Data

US 2014/0280440 A1 Sep. 18, 2014

(51) Int. Cl.
*H04W 76/02* (2009.01)
*H04L 29/08* (2006.01)
(Continued)

(52) U.S. Cl.
CPC ........... *H04W 76/02* (2013.01); *H04B 5/0031* (2013.01); *H04L 67/34* (2013.01); *H04W 4/001* (2013.01);
(Continued)

(58) Field of Classification Search
CPC ...... H04L 63/18; H04L 67/34; G06F 21/6245; G06F 3/0482; H04W 76/02; H04W 4/001; H04B 5/0031
(Continued)

(56) References Cited

U.S. PATENT DOCUMENTS 5,301,309 A 4/1994 Sugano
5,819,021 A 10/1998 Stanfill et al.
(Continued)

FOREIGN PATENT DOCUMENTS

EP 1760584 A 3/2007
EP 2432277 A1 * 3/2012
(Continued)

OTHER PUBLICATIONS

Frank Macey, Get iPhone iOS 5 Features Now: Use FaceTime Over 3G the iPhone FAQ, Aug. 8, 2011, iphonefaq.org, http://www.iphonefaq.org/archives/971488.*
(Continued)

*Primary Examiner* — Emmanuel L Moise
*Assistant Examiner* — Zi Ye
(74) *Attorney, Agent, or Firm* — Remarck Law Group PLC

(57) ABSTRACT

A computer-implemented technique for context-based application invocation for short-range wireless communication interactions can include exchanging sets of information between first and second computing devices via a short-range wireless communication medium. The set of information for a specific computing device can include at least one of (i) device type information for the specific computing device and (ii) user information for the specific computing device. The techniques can include performing, at one of the computing devices, at least one of a plurality of actions based on the set of information received from the other computing device. The plurality of actions can generally include (a) automatically configuring another wireless communication medium and (b) outputting a menu configured to receive a user selection from a set of operations associated with at least one of the short-range wireless communication medium and the other wireless communication medium.

30 Claims, 3 Drawing Sheets

(51) Int. Cl.
*H04W 4/00* (2009.01)
*G06F 15/16* (2006.01)
*H04B 5/00* (2006.01)
*G08C 17/02* (2006.01)
*H04W 8/00* (2009.01)

(52) U.S. Cl.
CPC .............. *H04W 4/008* (2013.01); *G08C 17/02* (2013.01); *H04M 2250/04* (2013.01); *H04W 8/005* (2013.01)

(58) Field of Classification Search
USPC ... 709/201; 455/41.1, 414.1; 726/4; 715/812
See application file for complete search history.

(56) References Cited

U.S. PATENT DOCUMENTS

| | | | |
|---|---|---|---|
| 6,462,767 B1 | 10/2002 | Obata et al. | |
| 6,634,025 B1 | 10/2003 | Hauptmann et al. | |
| 7,089,007 B2 | 8/2006 | Wakuta et al. | |
| 7,516,891 B2 | 4/2009 | Chaum | |
| 7,529,653 B2 | 5/2009 | Frankel et al. | |
| 7,775,432 B2 | 8/2010 | Jalkanen et al. | |
| 7,821,399 B2 | 10/2010 | Otranen | |
| 7,957,518 B2 | 6/2011 | Erb | |
| 7,957,733 B2 | 6/2011 | Wang et al. | |
| 7,962,142 B2 | 6/2011 | O'Neill et al. | |
| 7,970,350 B2 | 6/2011 | Sheynman et al. | |
| 7,995,533 B1 | 8/2011 | Koodi et al. | |
| 8,056,113 B2 | 11/2011 | Balasubramanian et al. | |
| 8,060,389 B2 | 11/2011 | Johnson | |
| 8,060,560 B2 | 11/2011 | Vonog et al. | |
| 8,112,066 B2* | 2/2012 | Ben Ayed | 455/411 |
| 8,126,395 B2 | 2/2012 | Balgard et al. | |
| 8,171,137 B1 | 5/2012 | Parks et al. | |
| 8,214,686 B2 | 7/2012 | Ueda | |
| 8,224,894 B1 | 7/2012 | Parks et al. | |
| 8,244,917 B2 | 8/2012 | Takayama et al. | |
| 8,308,065 B2 | 11/2012 | Jalkanen et al. | |
| 8,358,596 B2 | 1/2013 | Byrne et al. | |
| 8,366,000 B2 | 2/2013 | Jalkanen et al. | |
| 8,478,816 B2 | 7/2013 | Parks et al. | |
| 9,100,064 B2* | 8/2015 | Griffin | H04B 5/02 |
| 2002/0033981 A1 | 3/2002 | Keller et al. | |
| 2003/0220937 A1 | 11/2003 | Maeoka et al. | |
| 2004/0055004 A1 | 3/2004 | Sun et al. | |
| 2005/0058112 A1 | 3/2005 | Lahey et al. | |
| 2005/0235029 A1 | 10/2005 | Hussmann | |
| 2006/0094356 A1 | 5/2006 | Dawidowsky | |
| 2006/0179079 A1 | 8/2006 | Kolehmainen | |
| 2006/0294435 A1 | 12/2006 | Vick et al. | |
| 2007/0014314 A1 | 1/2007 | O'Neil | |
| 2007/0115827 A1 | 5/2007 | Boehnke et al. | |
| 2007/0136392 A1 | 6/2007 | Oh et al. | |
| 2007/0160047 A1 | 7/2007 | Park et al. | |
| 2007/0263828 A1 | 11/2007 | Lee et al. | |
| 2007/0282990 A1 | 12/2007 | Kumar et al. | |
| 2007/0297356 A1 | 12/2007 | Rofougaran | |
| 2008/0081558 A1 | 4/2008 | Dunko et al. | |
| 2008/0139116 A1 | 6/2008 | Balgard et al. | |
| 2008/0278567 A1 | 11/2008 | Nakajima | |
| 2008/0294937 A1 | 11/2008 | Ueda | |
| 2008/0310611 A1 | 12/2008 | Moriwaki et al. | |
| 2009/0003281 A1 | 1/2009 | Panabaker | |
| 2009/0111378 A1 | 4/2009 | Sheynman et al. | |
| 2009/0116445 A1 | 5/2009 | Samar et al. | |
| 2009/0118018 A1 | 5/2009 | Perlman et al. | |
| 2009/0132362 A1 | 5/2009 | Fisher et al. | |
| 2009/0157799 A1 | 6/2009 | Sukumaran et al. | |
| 2009/0204966 A1 | 8/2009 | Johnson et al. | |
| 2009/0244015 A1 | 10/2009 | Sengupta et al. | |
| 2009/0248875 A1 | 10/2009 | Kamijima et al. | |
| 2010/0031168 A1* | 2/2010 | Loriedo et al. | 715/760 |
| 2010/0081385 A1 | 4/2010 | Lin et al. | |
| 2010/0082136 A1 | 4/2010 | Rosenblatt et al. | |
| 2010/0082445 A1 | 4/2010 | Hodge et al. | |
| 2010/0082567 A1 | 4/2010 | Rosenblatt et al. | |
| 2010/0094948 A1 | 4/2010 | Ganesh et al. | |
| 2010/0167809 A1 | 7/2010 | Perlman et al. | |
| 2010/0178868 A1 | 7/2010 | Charrat | |
| 2010/0328225 A1 | 12/2010 | Black | |
| 2010/0332635 A1 | 12/2010 | Rogel et al. | |
| 2011/0047598 A1* | 2/2011 | Lindley et al. | 726/4 |
| 2011/0065384 A1 | 3/2011 | Cader et al. | |
| 2011/0072501 A1 | 3/2011 | Fukui | |
| 2011/0074703 A1 | 3/2011 | Black | |
| 2011/0078245 A1 | 3/2011 | Kiffer | |
| 2011/0119628 A1* | 5/2011 | Carter et al. | 715/812 |
| 2011/0148752 A1 | 6/2011 | Alameh et al. | |
| 2011/0183614 A1 | 7/2011 | Tamura | |
| 2011/0205944 A1 | 8/2011 | Miyabayashi et al. | |
| 2011/0210830 A1 | 9/2011 | Talty et al. | |
| 2011/0223937 A1 | 9/2011 | Leppanen et al. | |
| 2011/0275316 A1 | 11/2011 | Bacioccola | |
| 2011/0276503 A1 | 11/2011 | Whittington | |
| 2011/0312303 A1* | 12/2011 | Brush | H04M 3/38 455/414.1 |
| 2012/0028578 A1* | 2/2012 | Tuikka | 455/41.1 |
| 2012/0079126 A1 | 3/2012 | Evans et al. | |
| 2012/0142433 A1 | 6/2012 | Perlman et al. | |
| 2012/0143944 A1 | 6/2012 | Reeves et al. | |
| 2012/0144233 A1 | 6/2012 | Griffith et al. | |
| 2012/0149476 A1 | 6/2012 | Perlman et al. | |
| 2012/0214413 A1* | 8/2012 | Rose et al. | 455/41.1 |
| 2012/0290657 A1 | 11/2012 | Parks et al. | |
| 2012/0290663 A1 | 11/2012 | Hsieh et al. | |
| 2012/0290669 A1 | 11/2012 | Parks et al. | |
| 2012/0329390 A1 | 12/2012 | Kim | |
| 2013/0046976 A1 | 2/2013 | Rosati et al. | |
| 2013/0324169 A1 | 12/2013 | Kamal et al. | |
| 2013/0344804 A1 | 12/2013 | Chen et al. | |
| 2014/0073300 A1 | 3/2014 | Leeder et al. | |
| 2014/0087654 A1 | 3/2014 | Kiveisha et al. | |
| 2014/0254575 A1 | 9/2014 | Venkatraman et al. | |
| 2014/0256254 A1 | 9/2014 | Sarda et al. | |
| 2015/0237584 A1 | 8/2015 | Royston | |

FOREIGN PATENT DOCUMENTS

| | | |
|---|---|---|
| EP | 2483771 A1 | 8/2012 |
| EP | 2557764 A1 | 2/2013 |
| JP | 2003022189 A | 1/2003 |
| JP | 2003242106 A | 8/2003 |
| JP | 2004054633 A | 2/2004 |
| JP | 2006172440 A | 6/2006 |
| JP | 2010205111 A | 9/2010 |
| WO | 2005076542 A1 | 8/2005 |
| WO | 2005109829 A | 11/2005 |
| WO | 2006111782 A | 10/2006 |
| WO | 2007107982 A | 9/2007 |
| WO | 2010110788 A | 9/2010 |
| WO | 2011139963 A | 11/2011 |

OTHER PUBLICATIONS

Extended EP Search Report dated Aug. 22, 2012 for European Application No. 12167370.1 (8 pages).
Extended European Search Report, EP 12167367.7, Jul. 27, 2012, 8 pgs.
Extended European Search Report, EP 12167369.3, Jul. 27, 2012, 9 pgs.
Final Office Action dated Aug. 10, 2012 for U.S. Appl. No. 13/247,725 (14 pages).
ISR/WO, PCT/US2012/036952, Jul. 30, 2012, 12 pgs.
ISR/WO, PCT/US2012/036957, Jul. 30, 2012, 12 pgs.
Nickelsen, A. et al., "Service migration protocol for NFC links," Proceedings of the 16th EUNICE/IFIP WG 6.6 Conference on Networked Services, Jun. 28-30, 2010, pp. 41-50.
NL Search Report dated Dec. 19, 2012 for Application No. 2008777 (11 pages).
NL Search Report dated Dec. 21, 2012 for Application No. 2008779 (10 pages).

(56) References Cited

OTHER PUBLICATIONS

NL Search Report dated Nov. 28, 2012 for Application No. 2008778 (8 pages).
Non Final Office Action dated Dec. 8, 2011 for U.S. Appl. No. 13/247,725 (10 pages).
NonFinal Office Action dated Sep. 17, 2012 for U.S. Appl. No. 13/461,647 (7 pages).
PCT International Search Report and Written Opinion dated Aug. 22, 2012 for corresponding PCT International Application No. PCT/US2012/036961 (12 pages).
PCT International Search Report and Written Opinion dated Oct. 10, 2013 for PCT International Application No. PCT/US2013/050483 (10 pages).
UK Search Report dated Aug. 13, 2012 for GB Application No. 1208206.1 (5 pages).
UK Search Report dated Aug. 13, 2012 for GB Application No. 1208207.9 (3 pages).
UK Search Report dated Aug. 13, 2012 for GB Application No. 1208205.3 (6 pages).
International Search Report and Written Opinion for International Application No. PCT/US2014/025482 mailed Aug. 5, 2014 (11 pages).

\* cited by examiner

TECHNIQUES FOR CONTEXT-BASED APPLICATION INVOCATION FOR SHORT-RANGE WIRELESS COMMUNICATION INTERACTIONS

CROSS-REFERENCE TO RELATED APPLICATIONS

This application is related to co-pending U.S. application Ser. No. 13/834,900 filed on Mar. 13, 2013 and entitled "TECHNIQUES FOR AUTOMATICALLY ESTABLISHING A LONG-LASTING CONNECTION ACROSS COMPUTING DEVICES CONFIGURED FOR SHORT-RANGE WIRELESS COMMUNICATION." The disclosure of the above application is incorporated herein by reference in its entirety.

FIELD

The present disclose relates to communication between computing devices and, more particularly, to techniques for context-based application invocation for short-range wireless communication interactions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computing devices may be configured for short-range wireless communication, such as near field communication (NFC). For example, mobile phones can be configured for NFC with other mobile phones and/or other computing devices. NFC involves radio frequency (RF) communication between two or more computing devices over a relatively short distance, e.g., a few centimeters. Some software applications executable by these computing devices, however, may not be configured to utilize NFC.

SUMMARY

A computer-implemented technique is presented. The technique can include initiating, at a first computing device including one or more processors, short-range wireless communication with a second computing device via a short-range wireless communication medium. The technique can include determining, at the first computing device, a first set of information including at least one of (i) device type information for the first computing device and (ii) user information for the first computing device. The technique can include receiving, at the first computing device, a second set of information from the second computing device via the short-range wireless communication medium, the second set of information including at least one of (i) device type information for the second computing device and (ii) user information for the second computing device. The technique can also include performing, at the first computing device, at least one of a plurality of actions based on the first and second sets of information, the plurality of actions including: (a) automatically configuring, at the first computing device, communication via another wireless communication medium with the second computing device, wherein the communication between the first computing device and the second computing device via the other wireless communication medium is enabled when the short-range wireless communication medium is unavailable, and (b) determining, at the first computing device, a first set of operations that can be executed between the first computing device and the second computing device via at least one of the short-range wireless communication medium and the other wireless communication medium, and outputting, at the first computing device, a menu configured to (i) display the first set of operations and (ii) receive a selection of an operation from the first set of operations from a first user of the first computing device.

In some embodiments, the technique further includes receiving, at the first computing device, an indication from the second computing device via the short-range wireless communication medium that the second computing device is currently executing an application in a foreground of the second computing device, the application being non-compliant with the short-range wireless communication medium.

In other embodiments, at least one of the plurality of actions are performed based on the first and second sets of information and in response to receiving the indication.

In some embodiments, the device type information for the second computing device includes at least one of (i) a first configuration information for the other wireless communication medium for the second computing device and (ii) a first indication of a device type of the second computing device.

In other embodiments, the short-range wireless communication medium is near field communication (NFC), the other wireless communication medium is Bluetooth, and the first configuration information is a listening Bluetooth socket for the second computing device.

In some embodiments, the user information for the first computing device includes a first unique identifier for the first user associated with the first computing device, and the user information for the second computing device includes a second unique identifier for a second user associated with the second computing device.

In other embodiments, the first set of operations includes a second set of operations when the first unique identifier and the second unique identifier are different, and the first set of operations includes a third set of operations when the first unique identifier and the second unique identifier are the same, wherein the second set of operations is different than the third set of operations.

In some embodiments, the second set of operations includes exchanging contact information for the first and second users between the first computing device and the second computing device.

In other embodiments, the third set of operations includes at least one of (i) logging in, at the first computing device, to an account associated with the second computing device and (ii) receiving, at the first computing device, a digital item currently opened at the second computing device.

In some embodiments, the technique further includes determining, at the first computing device, a proposed selection for the user of one of the first set of operations based on at least one of preferences input by the user and past computing activity of the user.

In other embodiments, the menu is configured to display the first set of operations in a first configuration that automatically identifies the proposed selection for the user.

In some embodiments, the technique further includes determining, at the first computing device, a probability score for each of the first set of operations, wherein a specific probability score indicates a likelihood that the user will select a specific one of the first set of operations.

In other embodiments, the menu is configured to display the first set of operations in a second configuration that orders the first set of operations from a highest corresponding probability score to a lowest corresponding probability score.

In some embodiments, the menu is a pop-up menu that is displayed at the first computing device upon determining the first set of operations.

In other embodiments, the technique further includes automatically performing, at the first computing device, at least one of a second set of operations when both the first computing device and the second computing device are currently executing applications in their foregrounds, the applications being compliant with the short-range wireless communication medium, wherein the second set of operations is defined by at least one of the applications.

A first computing device is also presented. The first computing device can include a communication device and one or more processors. The communication device can be configured to initiate short-range wireless communication with a second computing device via a short-range wireless communication medium. The one or more processors can be configured to determine a first set of information including at least one of (i) device type information for the first computing device and (ii) user information for the first computing device. The communication device can be further configured to receive a second set of information from the second computing device via the short-range wireless communication medium, the second set of information including at least one of (i) device type information for the second computing device and (ii) user information for the second computing device. The one or more processors can be further configured to perform at least one of a plurality of actions based on the first and second sets of information, the plurality of actions including: (a) automatically configuring the communication device for communication via another wireless communication medium with the second computing device, wherein the communication between the first computing device and the second computing device via the other wireless communication medium is enabled when the short-range wireless communication medium is unavailable, and (b) determining a first set of operations that can be executed between the first computing device and the second computing device via at least one of the short-range wireless communication medium and the other wireless communication medium using the communication device, and outputting a menu via a user interface of the first computing device, wherein the menu is configured to (i) display the first set of operations and (ii) receive a selection of an operation from the first set of operations from a first user of the first computing device.

In some embodiments, the communication device is further configured to receive an indication from the second computing device via the short-range wireless communication medium that the second computing device is currently executing an application in a foreground of the second computing device, the application being non-compliant with the short-range wireless communication medium.

In other embodiments, the one or more processors are configured to perform at least one of the plurality of actions based on the first and second sets of information and in response to receiving the indication.

In some embodiments, the device type information for the second computing device includes at least one of (i) a first configuration information for the other wireless communication medium for the second computing device and (ii) a first indication of a device type of the second computing device.

In other embodiments, the short-range wireless communication medium is near field communication (NFC), the other wireless communication medium is Bluetooth, and the first configuration information is a listening Bluetooth socket for the second computing device.

In some embodiments, the user information for the first computing device includes a first unique identifier for the first user associated with the first computing device, and the user information for the second computing device includes a second unique identifier for a second user associated with the second computing device.

In other embodiments, the first set of operations includes a second set of operations when the first unique identifier and the second unique identifier are different, and the first set of operations includes a third set of operations when the first unique identifier and the second unique identifier are the same, wherein the second set of operations is different than the third set of operations.

In some embodiments, the second set of operations includes exchanging contact information for the first and second users between the first computing device and the second computing device.

In other embodiments, the third set of operations includes at least one of (i) logging in, using the one or more processors, to an account associated with the second computing device and (ii) receiving, using the communication device, a digital item currently opened at the second computing device.

In some embodiments, the one or more processors are further configured to determine a proposed selection for the user of one of the first set of operations based on at least one of preferences input by the user and past computing activity of the user.

In other embodiments, the menu is configured to display the first set of operations via the user interface in a first configuration that automatically identifies the proposed selection for the user.

In some embodiments, the one or more processors are further configured to determine a probability score for each of the first set of operations, wherein a specific probability score indicates a likelihood that the user will select a specific one of the first set of operations.

In other embodiments, the menu is configured to display the first set of operations via the user interface in a second configuration that orders the first set of operations from a highest corresponding probability score to a lowest corresponding probability score.

In some embodiments, the menu is a pop-up menu that is displayed via the user interface of the first computing device upon determining the first set of operations.

In other embodiments, the one or more processors are further configured to automatically perform at least one of a second set of operations when both the first computing device and the second computing device are currently executing applications in their foregrounds, the applications being compliant with the short-range wireless communication medium, wherein the second set of operations is defined by at least one of the applications.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
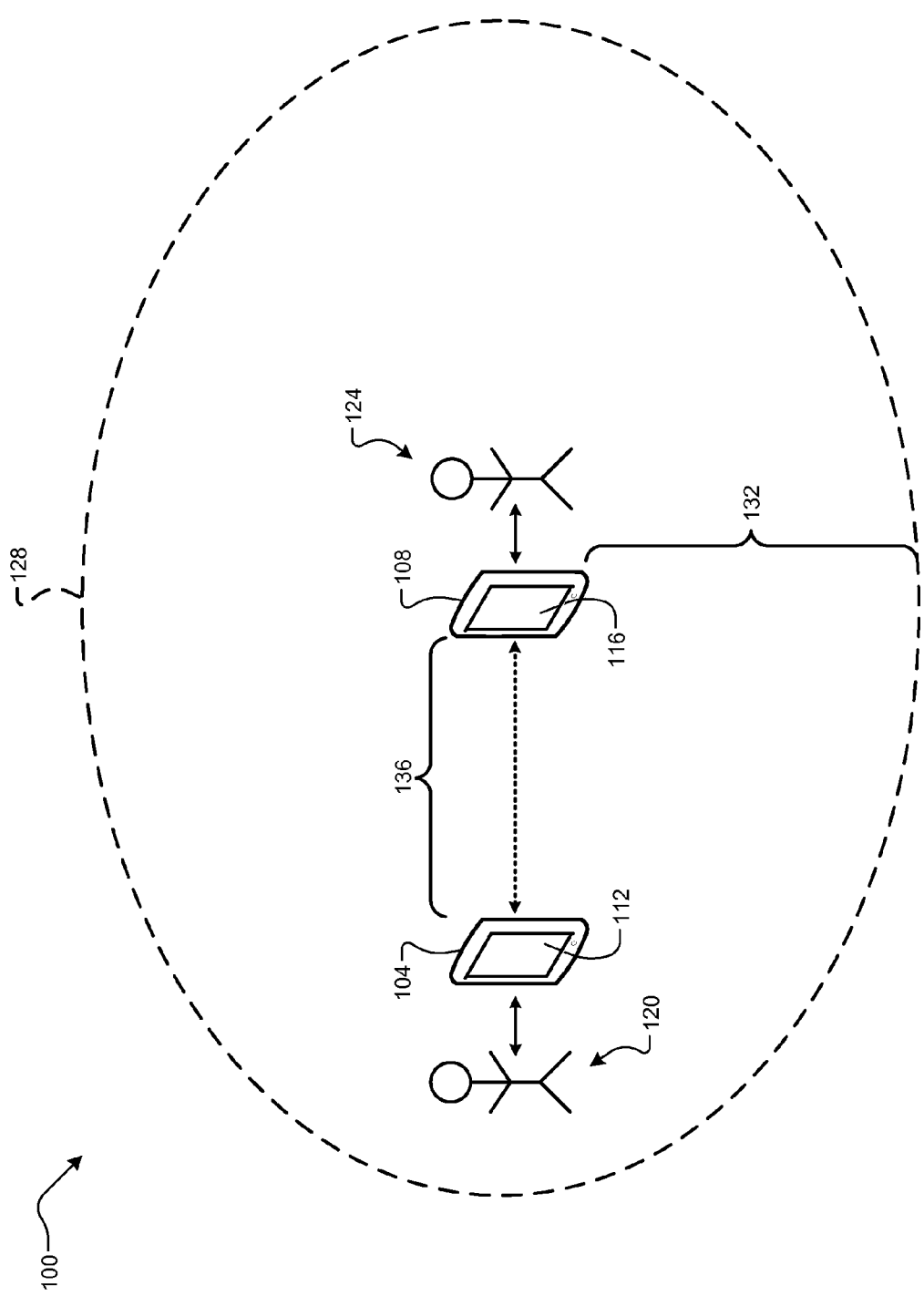
FIG. 1 is an illustration of short-range wireless communication between an example mobile computing device according to some implementations of the present disclosure and another mobile computing device.

As previously described, near field communication (NFC) involves radio frequency (RF) communication between two or more computing devices over a relatively short distance, e.g., a few centimeters. For example, a user may initiate NFC by positioning his/her mobile computing device within the required range for NFC with another computing device (a mobile computing device, a stationary computing device, etc.). As previously explained, however, some software applications executable by computing devices may not be configured to utilize NFC. When a software application executing on the mobile computing device is not NFC-compliant, the user may be unable to utilize any of a plurality of NFC-related operations after initiating NFC with the other computing device.

Accordingly, techniques are presented for context-based application invocation for short-range wireless communication interactions. While the techniques of the present disclosure are hereinafter described with specific reference to NFC and non-NFC mediums, it should be appreciated that the techniques of the present disclosure apply to other suitable short-range wireless communication mediums (Bluetooth, WiFi Direct, etc.) and other suitable non-short-range wireless communication mediums, e.g., WiFi. The techniques can include exchanging sets of information between first and second computing devices via NFC. The set of information for a specific computing device can include at least one of (i) device type information for the specific computing device and (ii) user information for the specific computing device. The techniques can include performing, at one of the computing devices, at least one of a plurality of actions based on the set of information received from the other computing device. The plurality of actions can generally include (a) automatically configuring non-NFC communication and (b) outputting a menu configured to receive a user selection from a set of NFC-based and/or non-NFC-based operations. It should be appreciated that the term "non-NFC communication" as used herein can refer to any other suitable wireless communication medium that is not NFC (or that is not the "short-range wireless communication medium").

As used herein, the terms "automatically configuring" can refer to configuring the non-NFC communication without user intervention/interaction. For example only, Bluetooth pairing typically involves the user inputting a code in order to verify the identity of the device. The techniques of the present disclosure, however, provide for "automatically configuring" non-NFC communication, e.g., Bluetooth pairing, without the user's intervention/interaction. Similarly, as used herein, the terms "automatically performing" and "automatically identifies" can refer to the computing device identifying a proposed selection for the user from the menu listing the first set of operations and/or automatically performing an operation without any user intervention/interaction. For example only, the computing device can highlight the proposed selection for the user or, in some cases, the computing device may automatically select the proposed selection for the user and perform the operation corresponding to the proposed selection.

Referring now to FIG. 1, a short-range wireless communication interaction 100, e.g., an NFC interaction, between an example mobile computing device 104 according to some implementations of the present disclosure and another mobile computing device 108 is illustrated. It should be appreciated that one or both of the mobile computing devices 104, 108 may be a stationary computing device (a desktop computer, a public computing terminal, etc.). For purposes of simplicity, the example mobile computing device 104 and the other mobile computing device 108 may be referred to herein as a first mobile computing device 104 and a second mobile computing device 108, respectively. The first mobile computing device 104 can receive input from and/or output information to a first user interface 112. Similarly, the second mobile computing device 108 can also receive input from and/or output information to a second user interface 116.

A first user 120 can interact with the first user interface 112, and a second user 124 can interact with the second user interface 116. In order to establish NFC between the first mobile computing device 104 and the second mobile computing device 108, the first mobile computing device 104 (the "initiator") may initiate communication with the second mobile computing device 108 (the "target"). Specifically, the first mobile computing device 104 may generate an electromagnetic field 128 using radio frequency (RF) waves. For example, the RF waves may have a frequency of approximately 13.56 megahertz (MHz) within a bandwidth of approximately 14 kilohertz (kHz). Other frequency ranges, however, may also be used.

The electromagnetic field 128 extends outwardly from the first mobile computing device 104 for a first distance 132. The electromagnetic field 128, therefore, may cover an area based on the first distance 132. For example, the first distance 132 to achieve a successful NFC transmission may be approximately 20 centimeters (cm). NFC transmissions at the first distance 132, however, may be inconsistent and therefore may suffer from data loss. Therefore, a second distance 136 may be desired for more effective NFC transmission, the second distance 136 being shorter than the first distance 132. For example, the second distance 136 may be approximately 4 cm.

When the second mobile computing device 108 is brought within the electromagnetic field 128, e.g., by the second user 124, the second mobile computing device 108 may behave according to one of two operating modes. In a passive operating mode, the second mobile computing device 108 modulates a load to communicate back to the first mobile computing device 104. In an active mode, on the other hand, the second mobile computing device 108 alternates with the first mobile computing device 104 in generating the electromagnetic field 128. In other words, during the active mode only one of the first mobile computing device 104 and the second mobile computing device 108 is generating the electromagnetic field 128 at a given time while the other mobile computing device waits for data.

The first mobile computing device 104 can also execute the techniques according to some implementations of the present disclosure. The first mobile computing device 104 can exchange sets of information with the second mobile computing device 108 via NFC. The set of information for a specific computing device can include at least one of (i) device type information for the specific computing device and (ii) user information for the specific computing device. The first mobile computing device 104 can then perform at least one of a plurality of actions based on the set of information received from the second mobile computing device 108. The plurality of actions (described in detail below) can generally include (a) automatically configuring non-NFC communication and (b) outputting a menu configured to receive a user selection from a set of NFC-based and/or non-NFC-based operations.

Figure 2:
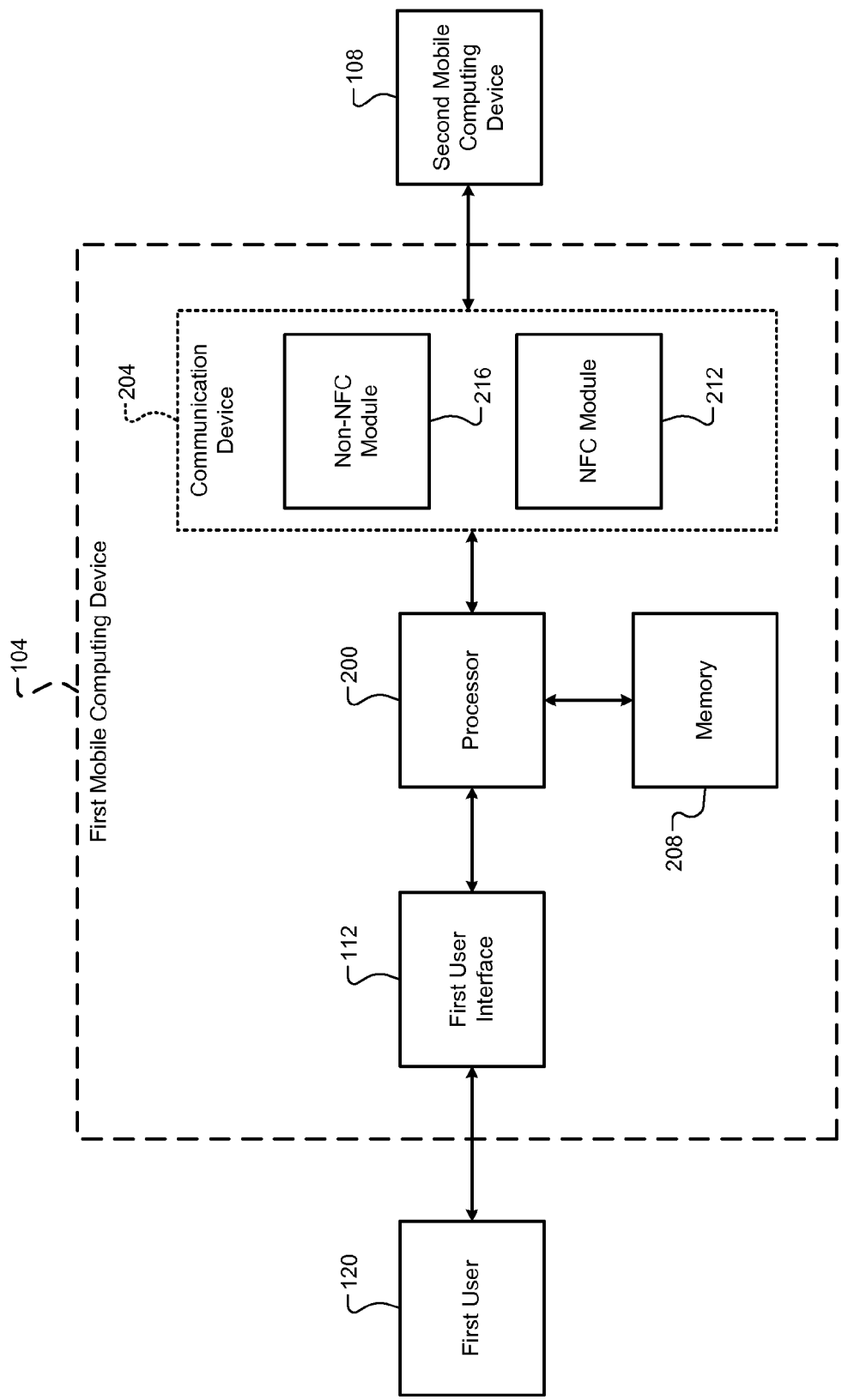
FIG. 2 is a functional block diagram of the example mobile computing device of FIG. 1.

Referring now to FIG. 2, a functional block diagram of the first mobile computing device 104 is illustrated. It should be appreciated that the second mobile computing device 108 can also have a same or similar functional block diagram. The first mobile computing device 104 can include the first user interface 112, a processor 200, a communication device 204, and a memory 208. As previously mentioned, the first user interface 112 can receive input and/or output information. For example, the first user interface 112 can receive input from the first user 120. The first user interface 112 can include any suitable components for receiving input and/or outputting information (a keyboard, a touch display, etc.).

The processor 200 can control operation of the first mobile computing device 104. It should be appreciated that the term "processor" as used herein can refer to either a single processor or two or more processors operating in a parallel or distributed architecture. The processor 200 can perform functions including, but not limited to, loading and executing an operating system of the first mobile computing device 104, controlling input/output at the first user interface 112, controlling communication between the first mobile computing device 104 and other computing devices, e.g., the second mobile computing device 108, via the communication device 204, and/or controlling read/write operations at the memory 208. The processor 200 can also execute the techniques according to some implementations of the present disclosure (described in detail below).

As mentioned above, the communication device 204 can control communication between the first mobile computing device 104 and other computing devices. The communication device 204 can further include an NFC module 212 and a non-NFC module 216. More specifically, the communication device 204 can use these modules to control NFC interaction and other forms of non-NFC interaction (WiFi, Bluetooth, etc.), respectively, between the first mobile computing device 104 and other computing devices, e.g., the second mobile computing device 108. The communication device 204 can include any suitable components for communicating via NFC and/or other communication mediums (a transceiver, an NFC chip, etc.). The memory 208 can be any suitable storage medium (flash, hard disk, etc.) configured to store information at the first mobile computing device 104.

As previously mentioned, the processor 200 can also execute the techniques of the present disclosure. More specifically, the processor 200 can perform at least one of a plurality of actions based on the received first set of information associated with the first mobile computing device 104 and the second set of information associated with the second mobile computing device 108. The processor 200 can determine the first set of information associated with the first mobile computing device 104 when NFC is initiated between the first mobile computing device 104 and the second mobile computing device 108. As previously explained, NFC can be initiated when the first mobile computing device 104 and the second mobile computing device 108 are within a predetermined distance from each other, e.g., 4 centimeters.

The first set of information can include at least one of (i) device type information for the first mobile computing device 104 and (ii) user information for the first mobile computing device 104. The device type information can include at least one of (i) configuration information for a non-NFC medium for communication by the first mobile computing device 104 and (ii) identifying information for a device type or class of the first mobile computing device 104 (a mobile phone, a tablet computer, a laptop computer, etc.). As previously mentioned, the first mobile computing device 104 may alternatively be a stationary computing device. The device type information, therefore, may also indicate other suitable devices types or classes (a desktop computer, a public computing terminal, a television, etc.). For example only, the non-NFC medium may be Bluetooth, and the configuration information may be a listening Bluetooth socket for the first mobile computing device 104. The user information can indicate a user associated with the first mobile computing device 104, e.g., the first user 120. The user information can be a unique or abstract identifier that is only associated with one particular user.

The first mobile computing device 104 can also receive the second set of information from the second mobile computing device 108 via NFC. The second mobile computing device 108 can determine and transmit the second set of information to the first mobile computing device 104 in response to a request from the first mobile computing device. Alternatively, the second mobile computing device 108 can automatically determine and transmit the second set of information to the first mobile computing device upon initiation of NFC. Similar to the first set of information described above, the second set of information can include at least one of (i) device type information for the second mobile computing device 108 and (ii) user information for the second mobile computing device 108. Again, the device type information can include at least one of (i) configuration information for a non-NFC medium for communication by the second mobile computing device 108, e.g., a listening Bluetooth socket for the second mobile computing device 108, and (ii) identifying information for a device type or class of the second mobile computing device 108.

The first mobile computing device 104 can then perform at least one of a plurality of actions based on the first and second sets of information. More specifically, the first mobile computing device 104 can compare the first set of information to the second set of information in order to determine shared or common capabilities with the second mobile computing device 108. In some implementations, the first mobile computing device 104 can perform at least one of the plurality of actions based on the first and second sets of information and in response to receiving an indication from the second mobile computing device 108 that the second mobile computing device 108 is currently executing a non-NFC-compliant application in a foreground of the second mobile computing device 108. Rather, upon initiating NFC, the second mobile computing device 108 may determine that it is currently executing a non-NFC-compliant application in its foreground, and thus may transmit the indication to the first mobile computing device 104.

Further, the first mobile computing device 104 can also transmit an indication to the second mobile computing device 108 that the first mobile computing device 104 is currently executing a non-NFC-compliant application in its foreground. In some implementations, receipt of the indication from the first mobile computing device 104 can cause the second mobile computing device 108 to transmit the second set of information to the first mobile computing device 104. Additionally, in some implementations, the processor 200 can automatically perform at least one of a second set of operations when both the first mobile computing device 104 and the second mobile computing device 108 are currently executing NFC-compliant applications in their foregrounds. The second set of operations can be different than a first set of operations (described in detail below) and can be defined by at least one of the NFC-compliant applications.

The plurality of actions can include (a) automatically configuring, at the first mobile computing device 104, communication via a non-NFC medium with the second mobile computing device 108. This alternate communication between the first mobile computing device 104 and the second mobile computing device 108 via the non-NFC medium can be enabled when NFC is unavailable, e.g., when the indication is received from the second mobile computing device 108. As previously mentioned, the non-NFC medium may be Bluetooth, and the first mobile computing device 104 can configure Bluetooth communication with the second mobile computing device 108 using a listening Bluetooth socket specified by the configuration information from the second mobile computing device 108.

The plurality of actions can also include determining, at the first mobile computing device 104, the first set of operations that can be executed between the first mobile computing device 104 and the second mobile computing device 108 via at least one of NFC and the non-NFC medium, and then outputting, at the first mobile computing device 104, a menu. The menu can be configured to (i) display the first set of operations and (ii) receive a selection of an operation from the first set of operations from the first user 120. The menu can be a pop-up menu that is displayed at the first mobile computing device 104 upon determining the first set of operations. For example only, the first set of operations can include, but is not limited to, exchanging contact information, transferring electronic funds, exchanging a file, launching/executing a player-to-player (P2P) application, logging into an account associated with one of the users 120, 124, exchanging a state of a web browser, and/or doing nothing.

When the first unique identifier and the second unique identifier are the same, the processor 200 can determine that the same user, e.g., user 120, is associated with both the first mobile computing device 104 and the second mobile computing device 108. For example only, the first user 120 may have a mobile phone and a tablet computer. In cases where the first user 120 is associated with both devices 104, 108, the menu can provide a different set of operations. The first set of operations, therefore, can include a second set of operations when the first unique identifier and the second unique identifier are different, and a third set of operations when the first unique identifier and the second unique identifier are the same. The second set of operations can be different than the third set of operations.

For example only, the second set of operations can include, but is not limited to, exchanging contact information for the first and second users 120, 124 between the first mobile computing device 104 and the second mobile computing device 108. Additionally, for example only, the third set of operations can include, but is not limited to, logging in, at the first mobile computing device 104, to an account associated with the second mobile computing device 108, or the second user 124, and/or receiving, at the first mobile computing device 104, a digital item currently opened at the second mobile computing device 108 (a file, a state of a web browser, a command to launch/execute a P2P application, etc.). These operations can also include switching a state of an application between a foreground and a background. It should be appreciated that these second and third sets of operations are different than the second set of operations previously discussed herein (when NFC-compliant applications are executing at both devices 104, 108) and, therefore, can also be referred to as first and second subsets of the first plurality of operations.

The processor 200 can also determine a proposed selection for the first user 120 of one of the first set of operations based on at least one of preferences input by the first user 120 and past computing activity of the first user 120. For example, the past computing activity of the first user 120 can include past NFC activity and/or application usage statistics. The menu, therefore, can be configured to display the first set of operations in a first configuration that automatically identifies the proposed selection for the first user 120, e.g., highlighted or identified with an arrow or other indicator. In some implementations, the processor 200 can determine a probability score for each of the first set of operations, wherein a specific probability score indicates a likelihood that the first user 120 will select a specific one of the first set of operations. In such implementations, the menu can be configured to display the first set of operations in a second configuration that orders the first set of operations from a highest corresponding probability score to a lowest corresponding probability score. For example only, the first set of operations can be ordered in a vertical list. Further, the menu may be configured to only display a subset of the first set of operations having probability scores greater than a predetermined confidence threshold indicating an acceptable likelihood that the first user 120 may select a particular operation.

Figure 3:
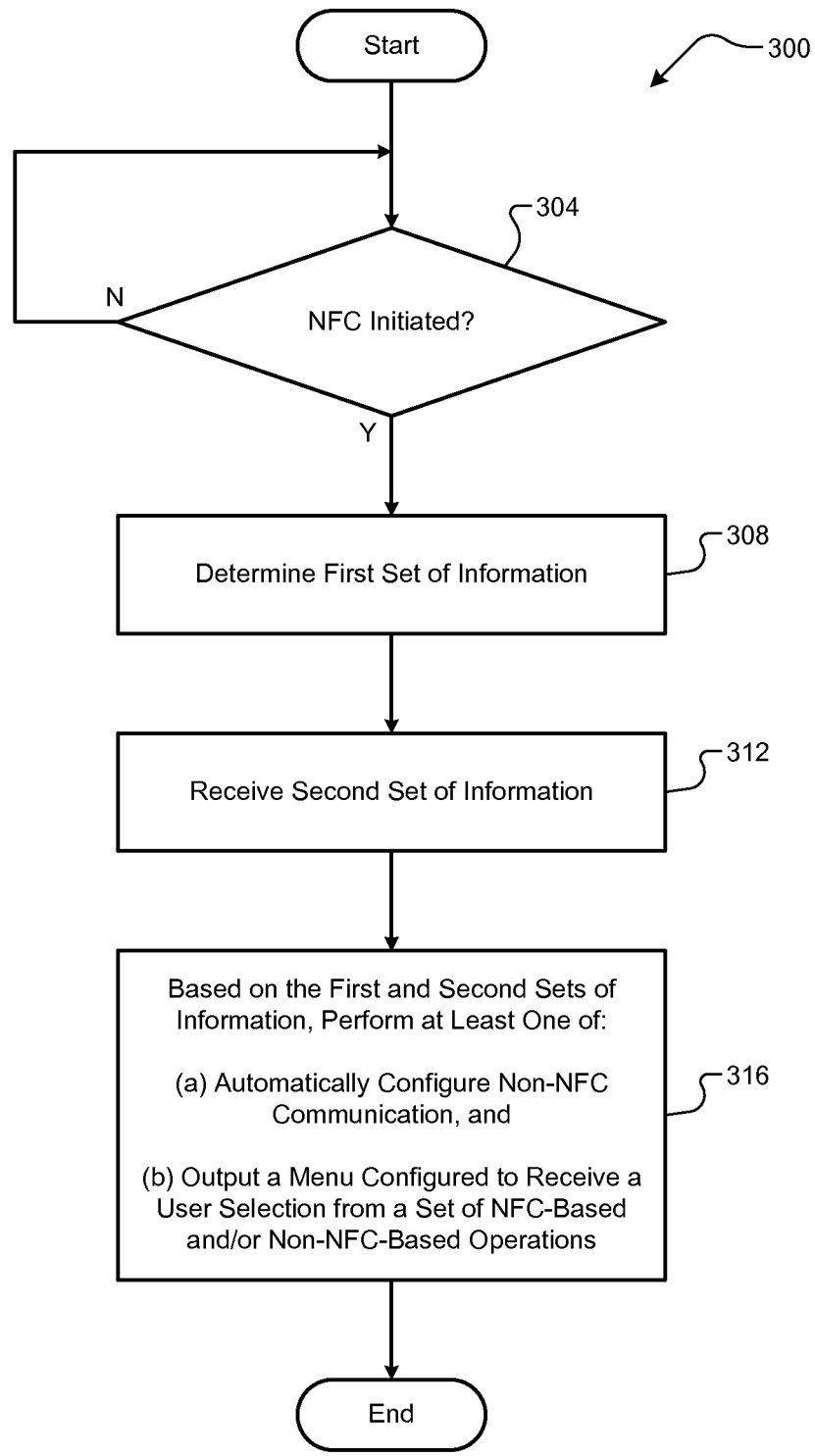
FIG. 3 is a flow diagram of an example technique for context-based application invocation for short-range wireless communication interactions according to some implementations of the present disclosure.

Referring now to FIG. 3, a flow diagram of an example technique 300 for context-based application invocation for NFC interactions is illustrated. At 304, the first mobile computing device 104 can initiate NFC with the second mobile computing device 108. At 308, the first mobile computing device 104 can determine a first set of information including at least one of (i) device type information for the first mobile computing device 104 and (ii) user information for the first mobile computing device 104. At 312, the first mobile computing device 104 can receive a second set of information from the second mobile computing device 108 via NFC. The second set of information can include at least one of (i) device type information for the second mobile computing device 108 and (ii) user information for the second mobile computing device 108. At 316, the first mobile computing device 104 can perform at least one of a plurality of actions based on the first and second sets of information.

The plurality of actions can include (a) automatically configuring, at the first mobile computing device 104, communication via a non-NFC medium with the second mobile computing device 108. The non-NFC medium communication between the first mobile computing device 104 and the second mobile computing device 108 can be enabled when NFC is unavailable. The plurality of actions can also include (b) determining, at the first mobile computing device 104, a first set of operations that can be executed between the first mobile computing device 104 and the second mobile computing device 108 via at least one of NFC and the non-NFC medium, and outputting, at the first mobile computing device 104, a menu. The menu can be configured to (i) display the first set of operations and (ii) receive a selection of an operation from the first set of operations from a first user of the first mobile computing device 104. If a selection is made from the menu, the first mobile computing device 104 can then execute the selected operation. The technique 300 can then end or return to 304 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
    initiating, at a first computing device including one or more processors, a near field communication (NFC) link with a second computing device via an NFC communication medium;
    determining, at the first computing device, a first set of information including at least one of (i) device type information for the first computing device and (ii) user information for the first computing device;
    receiving, at the first computing device from the second computing device via the NFC link, a second set of information including (i) device type information for the second computing device and (ii) user information for the second computing device;
    receiving, at the first computing device from the second computing device via the NFC link, an indication that the second computing device is currently executing an application in a foreground that is non-compliant with the NFC communication medium; and
    in response to receiving the indication, performing, at the first computing device, at least one of a plurality of actions based on the first and second sets of information, the plurality of actions including:
        (a) without user intervention/interaction, automatically configuring, at the first computing device, communication with the second computing device via a non-NFC communication medium, which is enabled when the application is compliant with the non-NFC communication medium, and
        (b) determining, at the first computing device, a first set of operations that can be executed between the first computing device and the second computing device via at least one of the NFC communication medium and the non-NFC communication medium, and outputting, at the first computing device, a menu configured to (i) display the first set of operations and (ii) receive a selection of an operation from the first set of operations from a first user of the first computing device.

2. The computer-implemented method of claim 1, wherein the device type information for the second computing device includes at least one of (i) a first configuration information for the non-NFC communication medium for the second computing device and (ii) a first indication of a device type of the second computing device.

3. The computer-implemented method of claim 2, wherein the non-NFC communication medium is Bluetooth, and wherein the first configuration information is a listening Bluetooth socket for the second computing device.

4. The computer-implemented method of claim 1, wherein the user information for the first computing device includes a first unique identifier for the first user associated with the first computing device, and wherein the user information for the second computing device includes a second unique identifier for a second user associated with the second computing device.

5. The computer-implemented method of claim 4, wherein the first set of operations includes a second set of operations when the first unique identifier and the second unique identifier are different, and wherein the first set of operations includes a third set of operations when the first unique identifier and the second unique identifier are associated with the same user, wherein the second set of operations is different than the third set of operations.

6. The computer-implemented method of claim 5, wherein the second set of operations includes exchanging contact information for the first and second users between the first computing device and the second computing device.

7. The computer-implemented method of claim 5, wherein the third set of operations includes at least one of (i) logging in, at the first computing device, to an account associated with the second computing device and (ii) receiving, at the first computing device, a digital item currently opened at the second computing device.

8. The computer-implemented method of claim 1, further comprising determining, at the first computing device, a proposed selection for the user of one of the first set of operations based on at least one of preferences input by the user and past computing activity of the user.

9. The computer-implemented method of claim 8, wherein the menu is configured to display the first set of operations in a first configuration that automatically identifies the proposed selection for the user.

10. The computer-implemented method of claim 1, further comprising determining, at the first computing device, a probability score for each of the first set of operations, wherein a specific probability score indicates a likelihood that the user will select a specific one of the first set of operations.

11. The computer-implemented method of claim 10, wherein the menu is configured to display the first set of operations in a second configuration that orders the first set of operations from a highest corresponding probability score to a lowest corresponding probability score.

12. The computer-implemented method of claim 1, wherein the menu is a pop-up menu that is displayed at the first computing device upon determining the first set of operations.

13. The computer-implemented method of claim 1, further comprising automatically performing, at the first computing device, at least one of a second set of operations when both the first computing device and the second computing device are currently executing applications in their foregrounds, the applications being compliant with the NFC communication medium, wherein the second set of operations is defined by at least one of the applications.

14. A first computing device, comprising:
- a communication device configured to initiate a near field communication (NFC) link with a second computing device via an NFC communication medium; and
- one or more processors configured to determine a first set of information including at least one of (i) device type information for the first computing device and (ii) user information for the first computing device,
- wherein the communication device is further configured to:
  - receive, from the second computing device via the NFC link, a second set of information including (i) device type information for the second computing device and (ii) user information for the second computing device; and
  - receive, from the second computing device via the NFC link, an indication that the second computing device is currently executing an application in a foreground that is non-compliant with the NFC communication medium; and
- wherein the one or more processors are further configured to, in response to receiving the indication, perform at least one of a plurality of actions based on the first and second sets of information, the plurality of actions including:
  - (a) without user intervention/interaction, automatically configuring the communication device for communication with the second computing device via a non-NFC communication medium, which is enabled when the application is compliant with the non-NFC communication medium, and
  - (b) determining a first set of operations that can be executed between the first computing device and the second computing device via at least one of the NFC communication medium and the non-NFC communication medium using the communication device, and outputting a menu via a user interface of the first computing device, wherein the menu is configured to (i) display the first set of operations and (ii) receive a selection of an operation from the first set of operations from a first user of the first computing device.

15. The first computing device of claim 14, wherein the device type information for the second computing device includes at least one of (i) a first configuration information for the non-NFC communication medium for the second computing device and (ii) a first indication of a device type of the second computing device.

16. The first computing device of claim 15, wherein the non-NFC communication medium is Bluetooth, and wherein the first configuration information is a listening Bluetooth socket for the second computing device.

17. The first computing device of claim 14, wherein the user information for the first computing device includes a first unique identifier for the first user associated with the first computing device, and wherein the user information for the second computing device includes a second unique identifier for a second user associated with the second computing device.

18. The first computing device of claim 17, wherein the first set of operations includes a second set of operations when the first unique identifier and the second unique identifier are different, and wherein the first set of operations includes a third set of operations when the first unique identifier and the second unique identifier are associated with the same user, wherein the second set of operations is different than the third set of operations.

19. The first computing device of claim 18, wherein the second set of operations includes exchanging contact information for the first and second users between the first computing device and the second computing device.

20. The first computing device of claim 18, wherein the third set of operations includes at least one of (i) logging in, using the one or more processors, to an account associated with the second computing device and (ii) receiving, using the communication device, a digital item currently opened at the second computing device.

21. The first computing device of claim 14, wherein the one or more processors are further configured to determine a proposed selection for the user of one of the first set of operations based on at least one of preferences input by the user and past computing activity of the user.

22. The first computing device of claim 21, wherein the menu is configured to display the first set of operations via the user interface in a first configuration that automatically identifies the proposed selection for the user.

23. The first computing device of claim 14, wherein the one or more processors are further configured to determine a probability score for each of the first set of operations, wherein a specific probability score indicates a likelihood that the user will select a specific one of the first set of operations.

24. The first computing device of claim 23, wherein the menu is configured to display the first set of operations via the user interface in a second configuration that orders the first set of operations from a highest corresponding probability score to a lowest corresponding probability score.

25. The first computing device of claim 14, wherein the menu is a pop-up menu that is displayed via the user interface of the first computing device upon determining the first set of operations.

26. The first computing device of claim 14, wherein the one or more processors are further configured to automatically perform at least one of a second set of operations when both the first computing device and the second computing device are currently executing applications in their foregrounds, the applications being compliant with the NFC communication medium, wherein the second set of operations is defined by at least one of the applications.

27. The computer-implemented method of claim 1, further comprising in response to receiving the indication and based on the first and second sets of information:
- determining, at the computing device, a first set of operations that can be executed between the first computing device and the second computing device via at least one of the NFC communication medium and the non-NFC communication medium using the communication device; and
- outputting, via a user interface of the first computing device, a menu configured to (i) display the first set of operations and (ii) receive a selection of an operation from the first set of operations from a first user of the first computing device.

28. The first computing device of claim 14, wherein the one or more processors are configured to in response to receiving the indication and based on the first and second sets of information:
- determine a first set of operations that can be executed between the first computing device and the second computing device via at least one of the NFC communication medium and the non-NFC communication medium using the communication device; and
- output, via a user interface, a menu configured to (i) display the first set of operations and (ii) receive a selection of an operation from the first set of operations from a first user of the first computing device.

29. A computer-implemented method comprising:
executing, by a first computing device, an application in a foreground of the first computing device;
establishing a near field communication (NFC) link between the first computing device and a second computing device;
determining, by the first computing device, that the foreground application is not NFC-compliant;
transmitting, from the first computing device to the second computing device via the NFC link, communication information, wherein receipt of the communication information causes the second computing device to automatically configure itself for communication with the first computing device via a non-NFC medium that is compliant with the foreground application;
establishing a non-NFC link between the first computing device and the second computing device;
determining a set of operations that can be executed between the first and second computing devices via the non-NFC link; and
executing, between the first and second computing devices via the non-NFC link, at least one of the set of operations.

30. The computer-implemented method of claim 29, wherein the non-NFC medium is Bluetooth, wherein the non-NFC link is a Bluetooth link, and wherein the communication information includes a Bluetooth socket for communication with the first computing device.

* * * * *